(12) United States Patent
Leonardson et al.

(10) Patent No.: US 7,140,250 B2
(45) Date of Patent: Nov. 28, 2006

(54) MEMS TEETER-TOTTER ACCELEROMETER HAVING REDUCED NON-LINEARTY

(75) Inventors: Ronald B. Leonardson, Redmond, WA (US); David L. Malametz, Lynnwood, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/145,909

(22) Filed: Jun. 6, 2005

(65) Prior Publication Data

US 2006/0185433 A1   Aug. 24, 2006

Related U.S. Application Data

(60) Provisional application No. 60/654,358, filed on Feb. 18, 2005.

(51) Int. Cl.
*G01P 15/02* (2006.01)
*G01P 15/125* (2006.01)
*G01C 19/00* (2006.01)

(52) U.S. Cl. .............. 73/504.14; 73/514.32; 73/514.38

(58) Field of Classification Search ......... 73/504.12, 73/504.14, 514.32, 514.29, 514.36, 514.38, 73/504.02, 504.04
See application file for complete search history.

(56) References Cited

U.S. PATENT DOCUMENTS

| | | | |
|---|---|---|---|
| 4,099,409 A | 7/1978 | Edmond | |
| 4,435,737 A | 3/1984 | Colton | |
| 4,736,629 A | 4/1988 | Cole | |
| 4,922,756 A | 5/1990 | Henrion | |
| 4,944,184 A | 7/1990 | Blake et al. | |
| 4,945,765 A | 8/1990 | Roszhart | |
| 5,006,487 A | 4/1991 | Stokes | |
| 5,024,089 A | 6/1991 | Norling | |
| 5,165,279 A | 11/1992 | Norling et al. | |
| 5,245,504 A | 9/1993 | Bullis et al. | |
| 5,484,073 A | 1/1996 | Erickson | |
| 5,650,568 A | 7/1997 | Greiff et al. | |
| 5,719,336 A | 2/1998 | Ando et al. | |
| 5,900,550 A | 5/1999 | Menzel | |
| 5,983,721 A * | 11/1999 | Sulzberger et al. | 73/514.32 |
| 6,000,287 A | 12/1999 | Menzel | |
| 6,167,757 B1 | 1/2001 | Yazdi et al. | |
| 6,199,874 B1 | 3/2001 | Galvin et al. | |

(Continued)

FOREIGN PATENT DOCUMENTS

DE   4126100 A1   2/1993

(Continued)

OTHER PUBLICATIONS

ABSTRACT, Patent Abstracts of Japan, Publication No. 10104263, Publication Date: Apr. 24, 1998; Application No. JP19960279995 19961001; Muro Hideo, et al. "Semiconductor Acceleration Sensor and Manufacture Thereof".

*Primary Examiner*—Helen Kwok

(57) ABSTRACT

An apparatus and method for force sensing device having a pendulous mechanism proof mass formed in a silicon semiconductor substrate and structured for rotation about an intermediate rotational axis, the proof mass being substantially rectangular in shape with opposing first and second lateral peripheral edges and opposing first and second endwise peripheral edges. A plurality of capacitor comb teeth are formed symmetrically along the opposing first and second endwise peripheral proof mass edges and along the opposing first and second lateral peripheral proof mass edges adjacent to the first and second endwise peripheral edges, and one or more mass reduction apertures are formed in an interior portion of the proof mass on one side of the intermediate hinge axis.

20 Claims, 2 Drawing Sheets

U.S. PATENT DOCUMENTS

| | | |
|---|---|---|
| 6,214,243 B1 * | 4/2001 | Muenzel et al. ................ 216/2 |
| 6,230,566 B1 | 5/2001 | Lee et al. |
| 6,285,111 B1 | 9/2001 | Hulsing, II |
| 6,428,713 B1 | 8/2002 | Christenson et al. |
| 6,497,141 B1 * | 12/2002 | Turner et al. ................. 73/105 |
| 6,571,628 B1 * | 6/2003 | Miao et al. ................... 73/488 |
| 6,642,067 B1 | 11/2003 | Dwyer |
| 6,768,181 B1 | 7/2004 | Dwyer |
| 6,841,992 B1 | 1/2005 | Yue et al. |
| 6,910,379 B1 * | 6/2005 | Eskridge et al. ......... 73/504.14 |
| 7,013,730 B1 * | 3/2006 | Malametz ................ 73/514.36 |

FOREIGN PATENT DOCUMENTS

| | | |
|---|---|---|
| EP | 1 031 837 A1 | 8/2000 |
| GB | 2 192 718 A | 1/1998 |

* cited by examiner

MEMS TEETER-TOTTER ACCELEROMETER HAVING REDUCED NON-LINEARTY

RELATED APPLICATIONS

This application claims the benefit of U.S. Provisional Application Ser. No. 60/654,358, filed in the names of Ronald B. Leonardson and David L. Malametz on Feb. 18, 2005, the complete disclosure of which is incorporated herein by reference.

FIELD OF THE INVENTION

The present invention relates to accelerometers and other force sensing devices and methods of forming and assembling the same, and in particular, MEMS electrostatic comb-drive capacitive accelerometers.

BACKGROUND OF THE INVENTION

MEMS is a popular acronym for Micro-Electro Mechanical Systems, of which monolithic silicon based accelerometers are a subset, of which vibration beam detection accelerometers are a further subset. MEMS vibration beam detection accelerometer devices are generally well-known.

Obtaining data from accelerometer output that has reduced non-linearity characteristics imposes significant obstacles for designs of micro-machined MEMS accelerometers. In out-of-plane accelerometers that rely upon stacked parallel capacitor plates for detection by capacitive pick-off, obtaining linear output has been difficult because the capacitance varies inversely with displacement of the out-of-plane pendulous proof mass by 1/d, where d is the distance between the capacitor plates on the pendulous proof mass and a relatively stationary frame from which the pendulous proof mass is suspended.

Therefore, devices and methods for overcoming these and other limitations of typical state of the art MEMS accelerometer and other devices are desirable.

SUMMARY OF THE INVENTION

The present invention is an apparatus and method for fabricating a MEMS accelerometer device that overcomes limitations of the prior art by providing a pendulous out-of-plane accelerometer having cooperative moveable and stationary comb teeth arranged for symmetric operation about the actual rotational center of the proof mass, whereby non-linearity is substantially eliminated from the acceleration detection systems and the acceleration sensing is provided by linear detection.

Capacitive-sensing MEMS accelerometer designs are extremely popular for operation in high-g environments and for their low cost. The small overall geometry of these devices is ideal for high-g packages that require minimum size. However, even with their small size, reducing non-linearity effect causes in capacitive-sensing MEMS accelerometers is highly desirable. Reduction in non-linearity effect causes results in increased accuracy of mathematical models and corresponding coefficients, without a corresponding significant increase in the level of mathematical modeling beyond a second order equation.

The present invention mounts comb tooth sensors at extreme ends and sides of the pendulous mechanism structure. These comb tooth sensors are spaced symmetrically about the computed actual center of rotation, which results in excellent differential symmetry.

According to one aspect of the invention, a large portion of material is removed from one side of the proof mass in order to achieve effective pendulosity while maintaining substantial differential symmetry.

According to one aspect of the invention, positioning of pick-off comb teeth symmetrically at the extreme sides and ends of the proof mass positions the pick-off comb teeth for excellent differential signal detection by positioning the pick-off comb teeth within the portions of the proof mass that experience the greatest displacement when exposed to an acceleration or other force field during operation.

According to another aspect of the invention, extreme side and end of positioning of pick-off comb teeth on the proof mass maintains substantial differential pick-off symmetry of the pendulous mechanism structure, while simultaneously incorporating desirable pendulosity through removing mass from the center of one side of the proof mass structure.

According to another aspect of the invention, a method for fabricating acceleration detection devices having non-linearity substantially eliminated therefrom is provided by extreme side and end of positioning of pick-off comb teeth on the proof mass using only a single processing mask set.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The Figures illustrate the accelerometer or other force sensing devices of the present invention, and methods for forming and assembling the same, by providing a substantially rectangular pendulous mechanism proof mass structure having multiple capacitive comb tooth sensors spaced symmetrically about an actual computed center of rotation thereof, with the multiple comb tooth sensors primarily at extreme side and end portions of the proof mass, which positions the pick-off comb teeth for substantially symmetrical differential signal detection within the portions of the proof mass that experience the greatest displacement when exposed to an acceleration or other force field during operation.

Additionally, a large portion of material is removed from the proof mass on one side of its axis of rotation, which maximizes pendulosity while maintaining symmetry of the differential signal detection.

Figure 1:
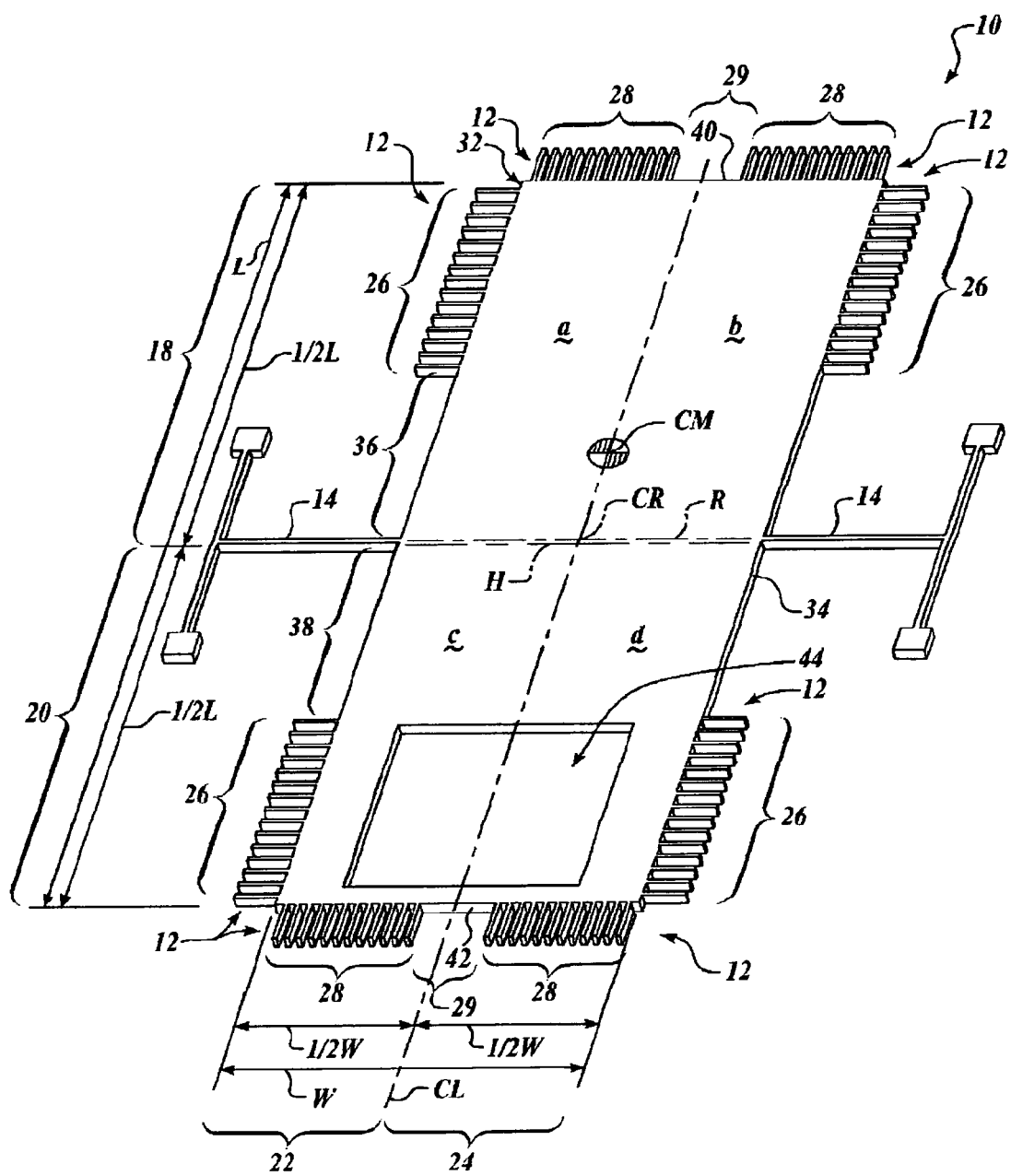
FIG. 1 is a top-down perspective view of one embodiment of the present invention.

FIG. 1 illustrates the present invention embodied as a pendulous proof mass structure 10 having multiple capacitive comb tooth sensors 12 spaced symmetrically about an actual computed center of rotation CR thereof. For example, the proof mass 10 is of a type commonly referred to as a "teeter-totter" proof mass that is suspended for rotation about an intermediate hinge axis H. The proof mass 10 is suspended for rotation about the hinge axis H on one or more torsional flexures 14 relative to a stationary frame structure 16 (shown in FIG. 2).

This embodiment of the invention has first and second lengthwise portions 18, 20 of the proof mass 10 on opposite of the hinge axis H, each of the first and second lengthwise portions 18, 20 being substantially identical in length, i.e., each of the first and second lengthwise proof mass portions 18, 20 being substantially one half the total length L of the proof mass 10. Additionally, this embodiment of the invention has first and second widthwise substantially symmetrical portions 22, 24 of the proof mass 10 positioned on opposite of the lengthwise center line CL, each of the first and second widthwise portions 22, 24 being substantially identical in width, i.e., each of the first and second widthwise proof mass portions 22, 24 being substantially one half the total width W of the proof mass 10. The proof mass 10 is thus divided into four quadrants a, b, c, and d divided along the hinge axis H and the lengthwise center line CL, with each being of the four quadrants a, b, c, d being substantially the same length and width as the others.

The multiple capacitive comb tooth sensors 12 are divided into respective lateral and endwise groupings 26, 28. Each of the proof mass quadrants a, b, c, d is formed with one of the lateral and endwise groupings 26, 28. As illustrated the lateral and endwise groupings 26, 28 of the comb tooth sensors 12 are positioned along the peripheral edges of the proof mass 10 adjacent to extreme ends of the first and second lengthwise proof mass portions 18, 20 where displacement of the out-of-plane pendulous proof mass 10 is maximized relative to the stationary frame 16. By example and without limitation, the lateral groupings 26 of comb tooth sensors 12 are positioned along respective opposing lateral peripheral edges 32, 34 of the proof mass 10 and spaced away from the hinge axis H at the extreme ends of the proof mass first and second lengthwise portions 18, 20. According to one embodiment of the invention, the lateral groupings 26 of capacitive comb tooth sensors 12 are positioned within a zone that is approximately one half or less of the length of the respective opposing lateral peripheral edges 32, 34 of the proof mass 10.

The comb tooth sensors 12 are eliminated from respective central peripheral lateral edge portions or "zones" 36, 38 of the first and second lengthwise portions 18, 20 of the proof mass 10 adjacent to the hinge axis H where displacement is minimized. The respective central peripheral edge zones 36, 38 of the first and second lengthwise proof mass portions 18, 20 that are free of the comb teeth 12 are approximately one half or more of the length of the respective opposing lateral peripheral edges 32, 34 of the proof mass 10 between the flexures 14 and the respective opposing endwise peripheral edges 40, 42 of the proof mass 10. The comb tooth sensors 12 are eliminated from the proof mass central zones 36, 38 so that the average differential signal is not diminished, but is instead maximized by the lateral groupings 26 of comb tooth sensors 12 being positioned at the extreme ends of the proof mass 10 where displacement is maximized.

The multiple endwise groupings 28 of capacitive comb tooth sensors 12 are positioned along the respective opposing endwise peripheral edges 40, 42 of the proof mass 10 and are therefore spaced a maximum distance away from the hinge axis H where displacement is maximized. The multiple endwise groupings 28 of capacitive comb tooth sensors 12 combine with the lateral groupings 26 at the extreme ends of the proof mass 10 to maximize the average differential signal.

Symmetry is achieved by providing substantially identical lateral groupings 26 of comb tooth sensors 12 along both opposing lateral peripheral edges 32, 34 of the proof mass 10 on both of the first and second lengthwise portions 18, 20, and substantially identical endwise groupings 28 of capacitive comb tooth sensors 12 along respective opposing endwise peripheral edges 40, 42 on both of the first and second widthwise portions 22, 24.

According to one embodiment of the invention, the proof mass 10 is unbalanced to achieve a desired pendulosity which causes the proof mass 10 to rotate about the flexures 14. By example and without limitation, the proof mass 10 is unbalanced by removal of a mass portion of material from an interior portion of one of the first and second lengthwise portions 18, 20 which result in one or more mass reduction or lightening apertures 44 being formed therein. The one or more lightening apertures 44 cause the proof mass portion a, b on one side of the hinge axis H to be more massive, i.e., to be heavier, than the proof mass portion c, d on the opposite side of the hinge axis H. The resultant mass imbalance permits the proof mass 10 to achieve a desired pendulosity, while maintaining symmetry of the comb tooth sensors 12 both along respective opposing lateral peripheral edges 32, 34 of the first and second lengthwise portions 18, 20, and along respective opposing endwise peripheral edges 40, 42 of the first and second widthwise portions 22, 24. The quantity, size and position of the lightening apertures 44 between the hinge axis H and the endwise peripheral edge 42 are selected to achieve a mass imbalance that results in a desired pendulosity of the proof mass 10. The lightening apertures 44 being larger and position farther from the hinge axis H for maximizing the mass imbalance.

The one or more lightening apertures 44 shift a center of mass CM of the proof mass 10 along the centerline CL away from the hinge axis H and away from the proof mass lengthwise portion 20 having the lightening apertures 44 and into the unmodified proof mass lengthwise portion 18 and toward the endwise peripheral edge 40 thereof. Movement of the proof mass center of mass CM toward the endwise peripheral edge 40 of the unmodified proof mass lengthwise portion 18 results in movement of an actual axis of rotation R of the proof mass 10 in the same direction away from the hinge axis H and toward the endwise peripheral edge 40 of the unmodified proof mass lengthwise portion 18. According to one embodiment of the invention, the lateral groupings 26 of capacitive comb tooth sensors 12 are moved to compensate for the movement of the axis of rotation R away from the hinge axis H and maintain symmetry of differential signal detection about the actual axis of rotation R. As described above, symmetry of the endwise groupings 28 of capacitive comb tooth sensors 12 along respective opposing endwise peripheral edges 40, 42 thus results in symmetric operation about the actual rotational center CR of the proof mass 10, whereby non-linearity is substantially eliminated from the force or acceleration detection system and the force sensing is provided by substantially linear differential signal detection.

An amount or distance that the proof mass center of mass CM and the actual rotational center CR and actual axis of rotation R of the proof mass 10 are shifted away from the hinge axis H along the lengthwise center line CL and toward the endwise peripheral edge 40 of the unmodified proof mass lengthwise portion 18 are determined by computer modeling of the proof mass 10, including the quantity, size and position of the lightening apertures 44 between the hinge axis H and the endwise peripheral edge 42. Thus, the actual computed center of rotation CR and the actual computed axis of rotation R for the substantially rectangular pendulous mechanism proof mass structure 10 of the invention having the multiple capacitive comb tooth sensors 12 and that is suspended for rotation on the one or more torsional flexures 14 positioned intermediate the proof mass structure 10 are determined by computer modeling of the proof mass 10.

Figure 2:
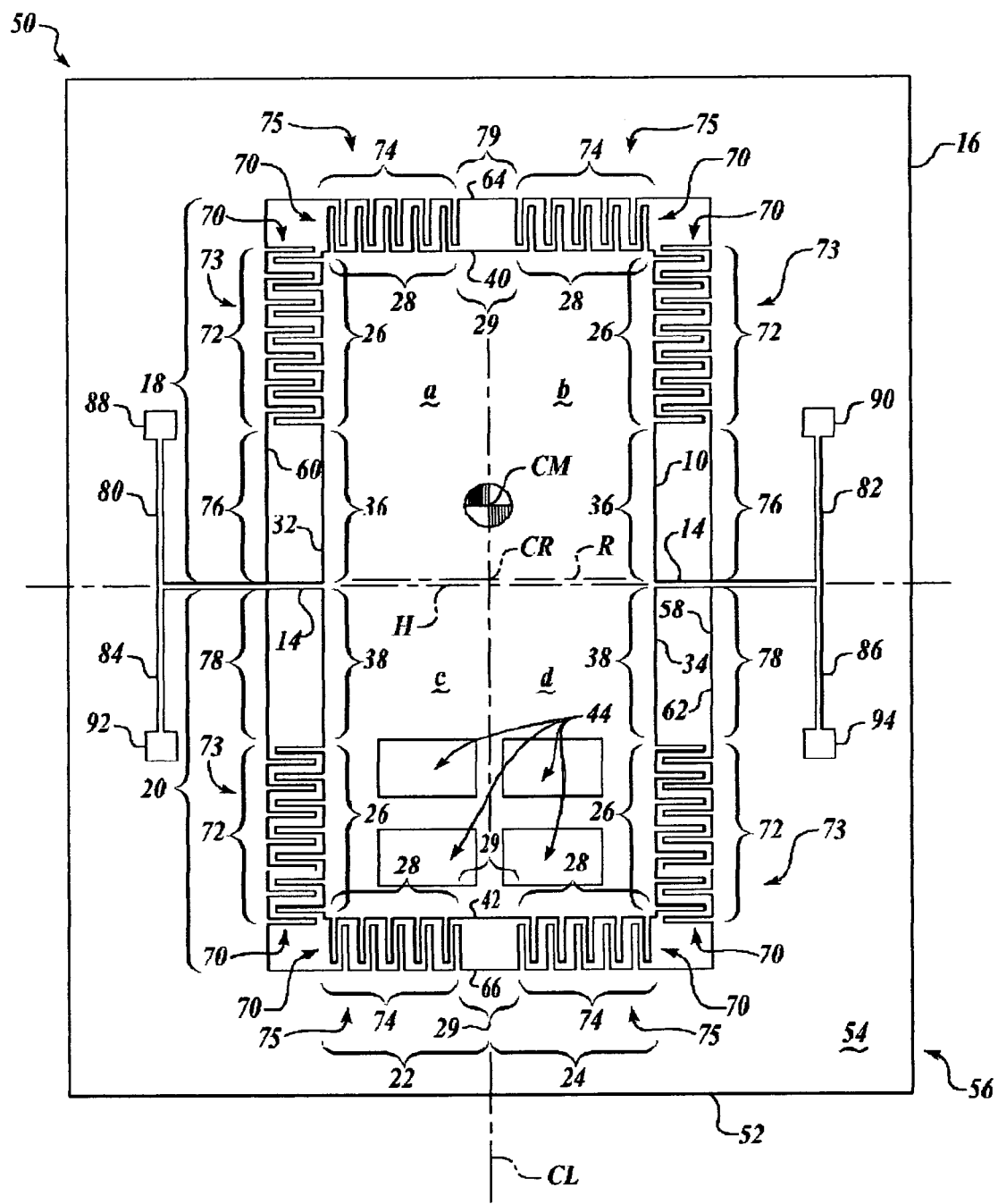
FIG. 2 is a plan view of the embodiment of the present invention illustrated in FIG. 1.

FIG. 2 illustrates by example and without limitation a sensor 50 of the invention for measuring acceleration or another force. The sensor 50 of the invention has at its core the pendulous proof mass structure 10 of the invention. As discussed herein, the proof mass 10 is suspended for rotation about the hinge axis H on one or more torsional flexures 14 relative to the stationary frame 16. The torsional flexures 14 enable the proof mass 10 to rotate about the hinge axis H. The proof mass structure 10, frame structure 16 and flexures 14 there between are all formed by conventional reactive ion etching (RIE) or deep reactive ion etching (DRIE) techniques in a single substrate 52 formed of semiconductor silicon material, the substrate 52 having first and second opposing substantially parallel planar surfaces 54, 56 (far side) that are spaced apart by the thickness of the substrate material. Each quadrant a, b, c, d of the proof mass 10 is formed with the lateral and endwise groupings 26, 28 of multiple capacitive comb tooth sensors 12 positioned along the respective opposing peripheral lateral and endwise edges 32, 34 and 40, 42 of the proof mass 10, while the respective central peripheral edge zones 36, 38 adjacent to the hinge axis H of the proof mass 10 are free of the comb tooth sensors 12. The comb tooth sensors 12 are thus positioned adjacent to extreme ends of the proof mass 10 where out-of-plane pendulous displacement is maximized relative to the stationary frame 16, and eliminated adjacent to the hinge axis H so that the average differential signal is not diminished, but is instead maximized by the lateral and endwise groupings 26, 28 of comb tooth sensors 12 positioned at the extreme ends of the proof mass 10 where displacement is maximized.

The proof mass 10 is suspended within a larger aperture 58 that is cut out of the frame 16. The frame aperture 58 is formed of respective opposing interior peripheral lateral and endwise edges 60, 62 and 64, 66 surrounding the proof mass 10 and offset substantially identical distances from the corresponding peripheral lateral and endwise edges 32, 34 and 40, 42 of the proof mass 10. The interior peripheral lateral and endwise edges 60, 62 and 64, 66 are formed with multiple capacitive comb teeth 70 spaced symmetrically thereabout.

The multiple capacitive comb teeth 70 are divided into respective lateral and endwise groupings 72, 74. One of the lateral groupings 72 and one of the endwise groupings 74 of comb teeth 70 is positioned to mate with each of the lateral and endwise groupings 26, 28 formed on each of the proof mass quadrants a, b, c, d, with individual frame comb teeth 70 positioned to form a capacitor with a corresponding comb tooth 12 on the proof mass 10. The comb teeth 70 are provided only to match corresponding comb teeth 12 on the proof mass 10. The matching comb teeth 12, 70 of the lateral proof mass and frame groupings 26, 72 form lateral groupings of capacitors 73; and the matching comb teeth 12, 70 of the endwise proof mass and frame groupings 28, 74 form endwise groupings of capacitors 75.

The frame comb teeth 70 are eliminated from respective central peripheral edge portions 76, 78 corresponding to respective central peripheral edge zones 36, 38 of the first and second lengthwise portions 18, 20 of the proof mass 10 so that signal detection is not compromised by signals emanating from the areas adjacent to the hinge axis H where displacement is minimized.

According to one embodiment of the invention, symmetry is optionally provided along the lengthwise center line CL by a gap 29 included between the endwise groupings 28 of capacitive comb tooth sensors 12 through which the respective opposing endwise peripheral edges 40, 42 of the proof mass 10 are exposed. When present, the optional gap 29 between the endwise groupings 28 on the proof mass 10 is matched by a gap 79 included between the endwise groupings 74 of the capacitive comb teeth 70 on the frame 16. When present, the gap 29 between the endwise groupings 28 ensures that an equal number of outside comb tooth sensors 12 are exposed on the proof mass 10, while equality of number is maintained between the comb tooth sensors 12 and capacitive comb teeth 70 in endwise groupings 74 on the frame 16.

Electrical conductors 80, 82, 84, 86 are provided on one of the surfaces 54, 56 for injecting a drive signal and retrieving a differential signal from the proof mass lateral and endwise groupings 26, 28 of comb teeth 12. The electrical conductors 80, 82, 84, 86 are coupled to the proof mass 10 via one or more of the flexures 14. Each of the electrical conductors 80, 82, 84, 86 is terminated on the frame 16 in a respective bond pad 88, 90, 92, 94 to which a transmission wire is bonded. For example, the bond pads 88, 90, 92, 94 are formed by metal, such as gold or aluminum, that is deposited by conventional metal deposition techniques.

According to the optional embodiment of the invention illustrated here, the proof mass 10 is unbalanced to shift the center of mass CM along the proof mass 10 centerline CL to achieve a desired pendulosity. The resultant pendulosity causes the proof mass 10 to rotate on the flexures 14 about the axis of rotation R that is spaced away from the hinge axis H and substantially parallel therewith. By example and without limitation, the proof mass 10 is unbalanced by multiple mass reduction or lightening apertures 44 formed therein. The lightening apertures 44 result from removal of a mass portion of material from an interior portion of one of the first and second lengthwise portions 18, 20. The quantity, size and position of the lightening apertures 44 between the hinge axis H and the endwise peripheral edge 42 are selected to achieve a desired pendulosity of the proof mass 10.

According to one embodiment of the invention, the lateral groupings 26 of capacitive comb tooth sensors 12 and mating lateral groupings 72 of capacitive comb teeth 70 are shifted to compensate for the movement of the axis of rotation R away from the hinge axis H. This shifting of the mating lateral groupings 12, 72 of capacitive comb teeth 12, 70 maintains the symmetry of differential signal detection about the axis of rotation R. Symmetry of the mating endwise groupings 28, 74 of capacitive comb teeth 12, 70 along respective opposing proof mass endwise peripheral edges 40, 42 and frame aperture interior peripheral endwise edges 64, 66 aids in achieving symmetric operation about the actual rotational center CR of the proof mass 10, whereby non-linearity is substantially eliminated from the force or acceleration detection device 50, which results in the force sensing provided by the detection device 50 being substantially linear differential signal detection.

According to one method for fabricating the acceleration detection device or other force sensing device 50 having non-linearity substantially eliminated therefrom is provided by positioning of the one or more mass reduction or lightening apertures 44 on one side 18 or 20 (shown) of the hinge axis H and positioning of pick-off comb teeth 26, 28 on the extreme side and end of the proof mass 10, respectively, using only a single processing mask set.

Determination by computer modeling of actual positions of the proof mass center of mass CM, rotational center CR and axis of rotation R as a function of the overall proof mass length L and width W and the quantity, size and position of the lightening apertures 44 permit the proof mass 10, flexures 14 and frame 16 to be fabricated by conventional reactive ion etching (RIE) or deep reactive ion etching (DRIE) techniques in the single substrate 52 using only a single processing mask set.

While the preferred embodiment of the invention has been illustrated and described, it will be appreciated that various changes can be made therein without departing from the spirit and scope of the invention.

What is claimed is:

1. A force sensing device, comprising:
   a pendulous mechanism proof mass formed in a silicon semiconductor substrate, the proof mass being substantially rectangular in shape with opposing first and second lateral peripheral edges and opposing first and second endwise peripheral edges and being structured for rotation about a rotational axis positioned substantially intermediate of the first and second lateral peripheral edges between the opposing first and second endwise peripheral edges;
   a plurality of capacitor comb teeth formed symmetrically along the opposing first and second endwise peripheral edges of the proof mass and along the opposing first and second lateral peripheral proof mass edges adjacent to the first and second endwise peripheral edges; and
   one or more mass reduction apertures formed in an interior portion of the proof mass on one side of the rotational axis.

2. The device of claim 1 wherein the plurality of capacitor comb teeth formed along the opposing first and second lateral peripheral proof mass edges are limited to symmetrical zones adjacent to the opposing first and second endwise peripheral proof mass edges and spaced away from the rotational axis.

3. The device of claim 2, further comprising opposing first and second symmetrical zones along the opposing first and second lateral peripheral proof mass edges and adjacent to the rotational axis, the first and second symmetrical zones being free of the capacitor comb teeth.

4. The device of claim 2 wherein the proof mass is substantially symmetrical in length and width relative to the rotational axis.

5. The device of claim 4 wherein a center of mass of the proof mass is offset from the rotational axis on an opposite side of the proof mass from the one or more mass reduction apertures.

6. The device of claim 5 wherein the one or more mass reduction apertures further comprises a single mass reduction aperture.

7. The inertial device of claim 1, further comprising:
   a frame substantially surrounding the proof mass;
   a plurality of capacitor comb teeth formed symmetrically along opposing first and second endwise interior peripheral frame edges and positioned to form a plurality of endwise capacitors with the plurality of capacitor comb teeth formed along the opposing first and second endwise peripheral proof mass edges; and
   a plurality of capacitor comb teeth formed symmetrically along opposing first and second lateral peripheral interior frame edges adjacent to the first and second endwise interior peripheral frame edges and positioned to form a plurality of lateral capacitors with the plurality of capacitor comb teeth formed symmetrically along the opposing first and second lateral peripheral proof mass edges.

8. The device of claim 7, further comprising one or more flexures formed between the proof mass and the frame, the rotational axis being offset away from an axis of the one or more flexures and toward the center of mass of the proof mass.

9. A force sensing device comprising:
   a frame;
   a proof mass surrounded by the frame and suspended therefrom for out-of-plane rotation on a pair of torsional flexures positioned substantially intermediate of a length dimension of the proof mass; and
   first and second pluralities of capacitors formed between a first plurality of comb teeth formed on exterior peripheral edges of the proof mass and a cooperating second plurality of comb teeth formed on interior peripheral edges of the frame, the first and second pluralities of capacitors being spaced symmetrically about a center of rotation of the proof mass.

10. The device of claim 9 wherein the first plurality of capacitors further comprises a first plurality of comb teeth positioned within lateral zones along opposing first and second lateral exterior peripheral edges of the proof mass adjacent to first and second endwise exterior peripheral edges thereof operable in cooperation with a first plurality of comb teeth positioned within lateral zones along opposing first and second lateral interior peripheral frame edges adjacent to first and second endwise interior peripheral frame edges; and
   wherein the second plurality of capacitors further comprises a second plurality of comb teeth positioned within endwise zones along the opposing first and second endwise exterior peripheral edges of the proof mass operable in cooperation with a second plurality of comb teeth positioned within endwise zones along the opposing first and second endwise interior peripheral frame edges.

11. The device of claim 10 wherein the first plurality of comb teeth positioned within the lateral zones are limited to portions of the first and second lateral exterior peripheral edges of the proof mass that are spaced away from the flexures; and
   wherein lateral zones along opposing first and second lateral exterior peripheral edges of the proof mass adjacent to the flexures are free of the comb teeth.

12. The device of claim 11 wherein the lateral zones along opposing first and second exterior lateral peripheral edges of the proof mass adjacent to the flexures extend substantially one half or more of a distance between the flexures and the respective opposing first and second endwise exterior peripheral edges of the proof mass.

13. The device of claim 9, further comprising one or more mass reduction apertures formed in an interior portion of the proof mass on one side of the flexures.

14. The device of claim 13 wherein the center of rotation of the proof mass is offset from a hinge axis formed by the flexures suspending the proof mass from the frame; and
   wherein the proof mass rotates about a rotational axis that is offset from the hinge axis formed by the flexures and passes through the center of rotation of the proof mass.

15. A method for fabrication of a capacitive comb tooth sensor having substantially symmetrical differential signal detection, the method comprising:

in a substrate formed of semiconductor silicon material and having first and second opposing substantially parallel spaced-apart planar surfaces, forming a substantially rectangular pendulous mechanism proof mass structure having a plurality of capacitive comb tooth sensors spaced symmetrically about a computed center of rotation thereof, with first and second endwise groupings of the comb tooth sensors being positioned along each of respective opposing first and second end portions of the proof mass distal from the center of rotation, and first and second lateral groupings of the comb tooth sensors being positioned along each of respective extreme side portions of the proof mass adjacent to each of the opposing end portions and spaced away from the center of rotation with central zones of each of the side portions being devoid of the comb tooth sensors;

in the substrate, forming a frame structure having a substantially rectangular aperture surrounding the proof mass and spaced therefrom;

in the substrate, forming one or more flexures between the proof mass and the frame positioned substantially intermediate of a length dimension of the proof mass, the one or more flexures being structured for out-of-plane rotation of the proof mass relative to the frame about a rotational axis that passes through the computed center of rotation; and in the substrate, forming a plurality of comb teeth in first and second endwise groupings along respective first and second endwise interior peripheral edges of the frame and being positioned to cooperate with respective first and second endwise groupings of the comb tooth sensors of the proof mass, and first and second lateral groupings of comb teeth along respective first and second opposing interior peripheral lateral edges of the frame and being positioned to cooperate with respective first and second lateral groupings of the comb tooth sensors of the proof mass.

16. The method of claim 15 wherein the forming a substantially rectangular pendulous mechanism proof mass structure further comprises forming one or more mass reduction apertures therein positioned on one side of the one or more flexures.

17. The method of claim 16 wherein the forming a plurality of comb teeth between the proof mass and the frame and positioned substantially symmetrically about the rotational axis further comprises:

along a first end edge of the proof mass positioned on a first side of the rotational axis and spaced away therefrom, forming a first endwise grouping of the comb tooth sensors;

along a second end edge of the proof mass positioned on an opposite second side of the rotational axis and spaced away therefrom, forming a second endwise grouping of the comb tooth sensors that is symmetrical with the first endwise grouping of the comb tooth sensors;

on a first portion of the proof mass positioned on the first side of the rotational axis, forming first and second lateral groupings of the comb tooth sensors along respective first and second opposing side edges of the proof mass and spaced away from the rotational axis with the first and second lateral groupings being substantially symmetric about the computed center of rotation;

on a second portion of the proof mass positioned on the second side of the rotational axis opposite from the first portion of the proof mass, forming third and fourth lateral groupings of the comb tooth sensors along respective first and second opposing side edges of the proof mass that are spaced away from the rotational axis with the third and fourth lateral groupings of the comb tooth sensors being substantially symmetric about the computed center of rotation and being symmetric about the rotational axis with respective first and second lateral groupings of the comb tooth sensors on the first side of the rotational axis.

18. The method of claim 17 wherein the rotational axis is offset from a hinge axis that passes through the one or more flexures, the rotational axis being offset in a direction that is opposite from the one or more mass reduction apertures.

19. The method of claim 18 wherein each of the first and second endwise groupings of the comb tooth sensors further comprises a pair of endwise groupings of the comb tooth sensors that are spaced apart substantially symmetrically on opposite sides of a lengthwise centerline of the proof mass that passes through the computed center of rotation.

20. The method of claim 15, further comprising determining by computer modeling the computed center of rotation and the rotational axis for the substantially rectangular pendulous mechanism proof mass structure having multiple capacitive comb tooth sensors and that is suspended for rotation on one or more torsional flexures positioned substantially intermediate of the length dimension of the proof mass.

* * * * *